(12) United States Patent
Yao et al.

(10) Patent No.: US 11,762,708 B2
(45) Date of Patent: Sep. 19, 2023

(54) DECENTRALIZED RESOURCE SCHEDULING

(71) Applicant: INTERNATIONAL BUSINESS MACHINES CORPORATION, Armonk, NY (US)

(72) Inventors: Le Yao, Xi'an (CN); Geng Hu, Xi'an (CN); Dong Ping Song, Xi'an (CN); Wei W X Xian, Xi'an (CN); Madeline Ma, Xi'an (CN); Zhan Wei Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/304,424

(22) Filed: Jun. 21, 2021

(65) Prior Publication Data

US 2022/0405131 A1 Dec. 22, 2022

(51) Int. Cl.
  *G06F 9/46* (2006.01)
  *G06F 9/50* (2006.01)
  *G06F 9/48* (2006.01)

(52) U.S. Cl.
  CPC .......... *G06F 9/505* (2013.01); *G06F 9/485* (2013.01)

(58) Field of Classification Search
  CPC .................. G06F 9/505; G06F 9/485
  See application file for complete search history.

(56) References Cited

U.S. PATENT DOCUMENTS

| | | | |
|---|---|---|---|
| 9,509,621 B2 | 11/2016 | Gulati | |
| 9,563,453 B2 | 2/2017 | Gulati | |
| 10,146,593 B2 | 12/2018 | Gong | |
| 10,333,782 B1 | 6/2019 | Kitagawa | |
| 2018/0239651 A1 | 8/2018 | Gong et al. | |
| 2019/0324819 A1 | 10/2019 | Zeng et al. | |
| 2021/0019176 A1 | 1/2021 | Pasupuleti et al. | |
| 2021/0157655 A1 | 5/2021 | Foreman | |

FOREIGN PATENT DOCUMENTS

CN 109271243 B 9/2021

OTHER PUBLICATIONS

International Search Report and Written Opinion, International Application No. PCT/CN2022/091864, International Filing Date: May 10, 2022, dated Aug. 11, 2022, 10 pages.
Mell, et al., "The NIST Definition of Cloud Computing", National Institute of Standards and Technology, Special Publication 800-145, Sep. 2011, 7 pages.

*Primary Examiner* — Gregory A Kessler
(74) *Attorney, Agent, or Firm* — Steven M. Bouknight

(57) ABSTRACT

Methods, apparatus, computer program products for resource scheduling are provided. The method comprises: receiving a workload request; publishing the information of the workload to a workload billboard accessible to a plurality of computer hosts, each of the plurality of computer hosts being associated with a corresponding proxy configured to manage the resource scheduling of the computer host; receiving a request to schedule at least a portion of the workload from a proxy; and sending the portion of the workload to the computer host associated with the proxy.

20 Claims, 7 Drawing Sheets

DECENTRALIZED RESOURCE SCHEDULING

BACKGROUND

The present application relates to computing, and more specifically, to methods, systems and computer program products for resource management and scheduling.

The explosive demand of cloud computing has led to the need of carefully managing resources that provide services to the users. Resource scheduling includes the process of organizing the resources among different cloud users according to certain rules and regulations of resource usage under a specified cloud environment. Resource scheduling in resource management is the basic technology of cloud computing which includes the appropriate generation of the schedule that decides which tasks will be mapped on to which resources. The aim behind resource scheduling is the extreme usage of resources. However, well organized scheduling is needed for both cloud providers and cloud users.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment in the present disclosure, there is provided a computer-implemented method performed by one or more processing units for resource scheduling, comprising: receiving a workload request; publishing information from the workload associated with the workload request to a workload billboard accessible to a plurality of computer hosts, each of the plurality of computer hosts being associated with a corresponding proxy for managing the resource scheduling of the computer host; receiving a request to schedule at least a portion of the workload from a proxy; and sending the portion of the workload to the computer host associated with the proxy.

In one illustrative embodiment in the present disclosure, there is provided a computer-implemented system. The computer-implemented system comprises a processor; a memory medium, coupled to the processor and comprising program instructions, wherein the program instructions comprising: program instructions to receive a workload request; program instructions to publish the information from a workload associated with the workload request to a workload billboard accessible to a plurality of computer hosts, each of the plurality of computer hosts being associated with a corresponding proxy for managing the resource scheduling of the computer host; program instructions to receive a request to schedule at least a portion of the workload from a proxy; and program instructions to send the portion of the workload to the computer host associated with the proxy.

Computer program products are also provided.

These and other features and advantages in the present disclosure will be described in or will become apparent to those of ordinary skill in the art in view of, the following detailed description of the example embodiments in the present disclosure.

BRIEF DESCRIPTION OF THE DRAWINGS

Through the more detailed description of some embodiments in the present disclosure in the accompanying drawings, the above and other objects, features and advantages in the present disclosure will become more apparent, wherein the same reference generally refers to the same components in the embodiments in the present disclosure.

DETAILED DESCRIPTION

Figure 1:
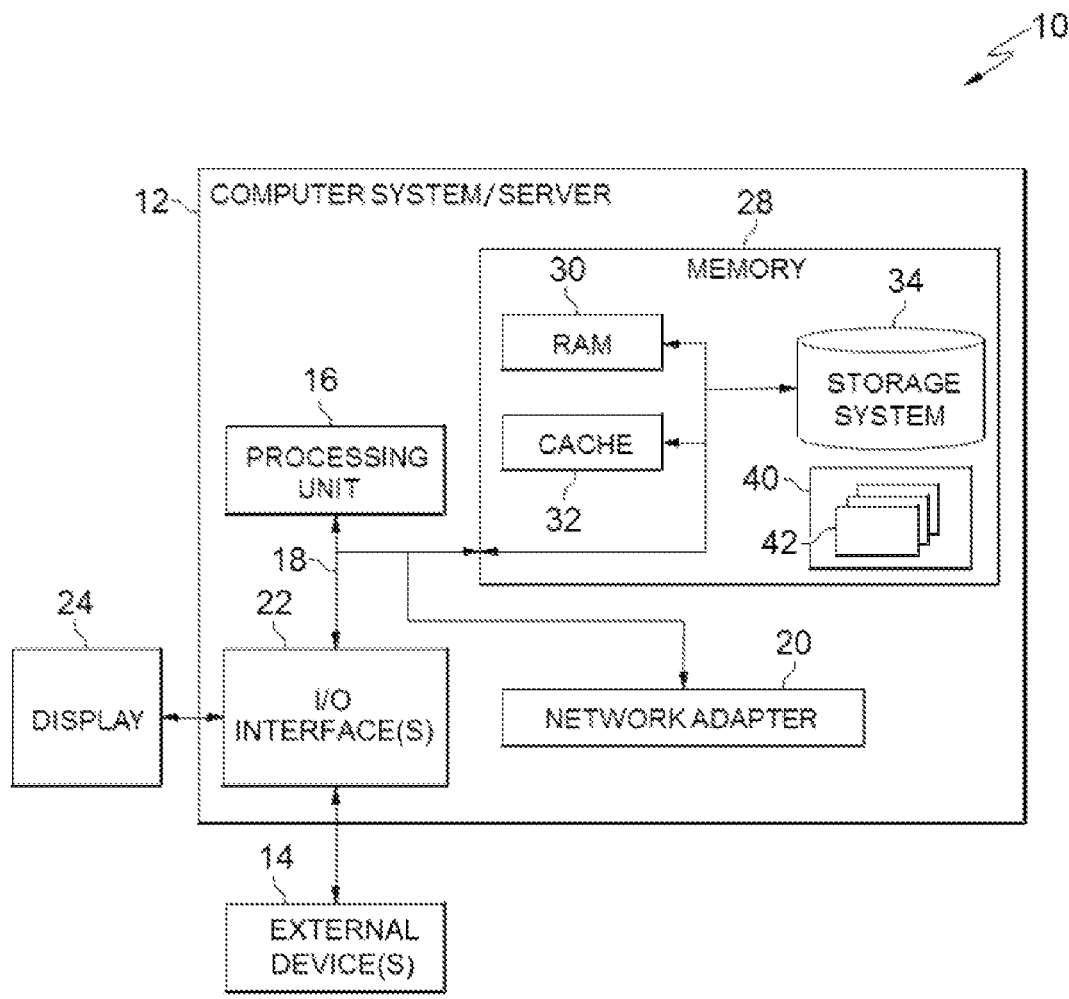
FIG. 1 shows an exemplary computer system which is applicable to implement some embodiments in the present disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments in the present disclosure may be implemented with, however not limited to, a cloud computing environment which will be described in the following.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment in the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
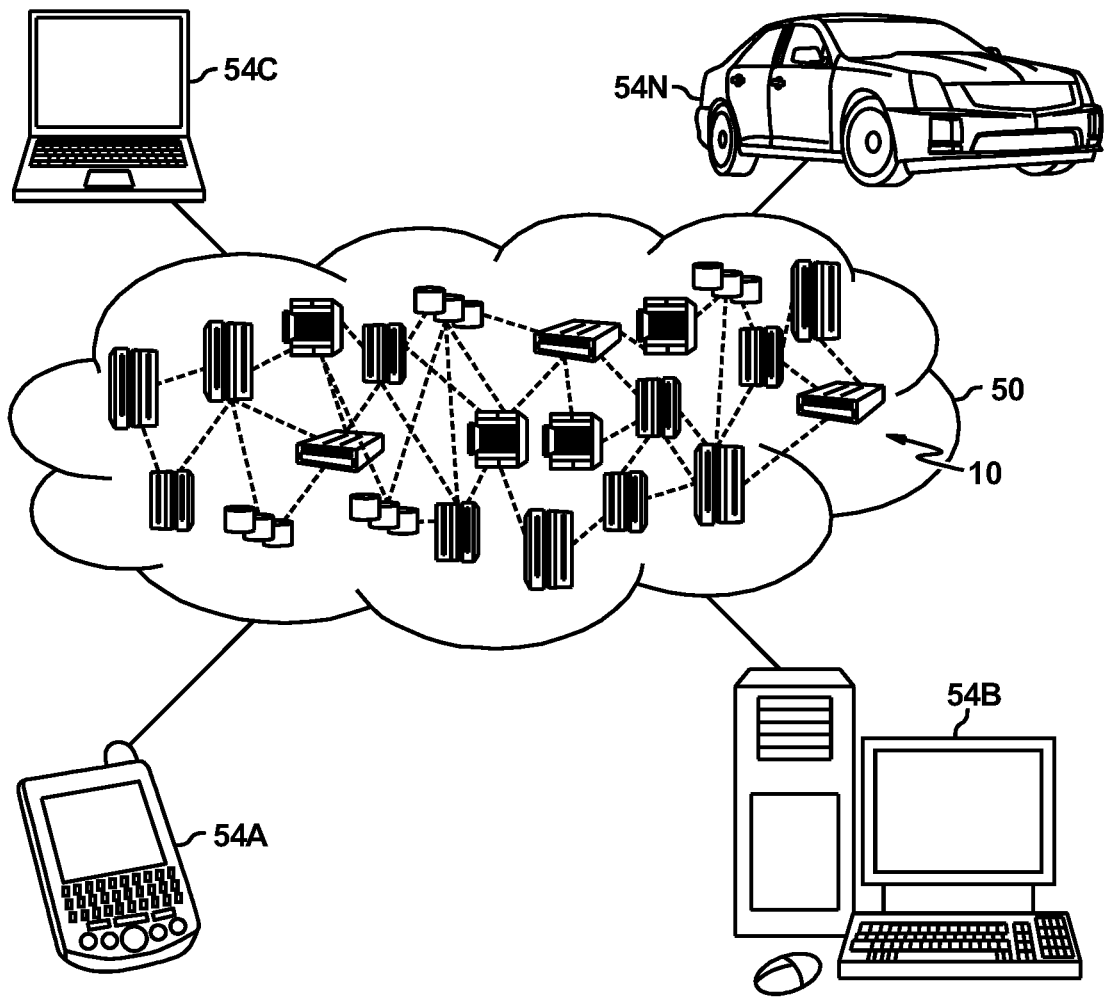
FIG. 2 depicts a cloud computing environment according to some embodiments in the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
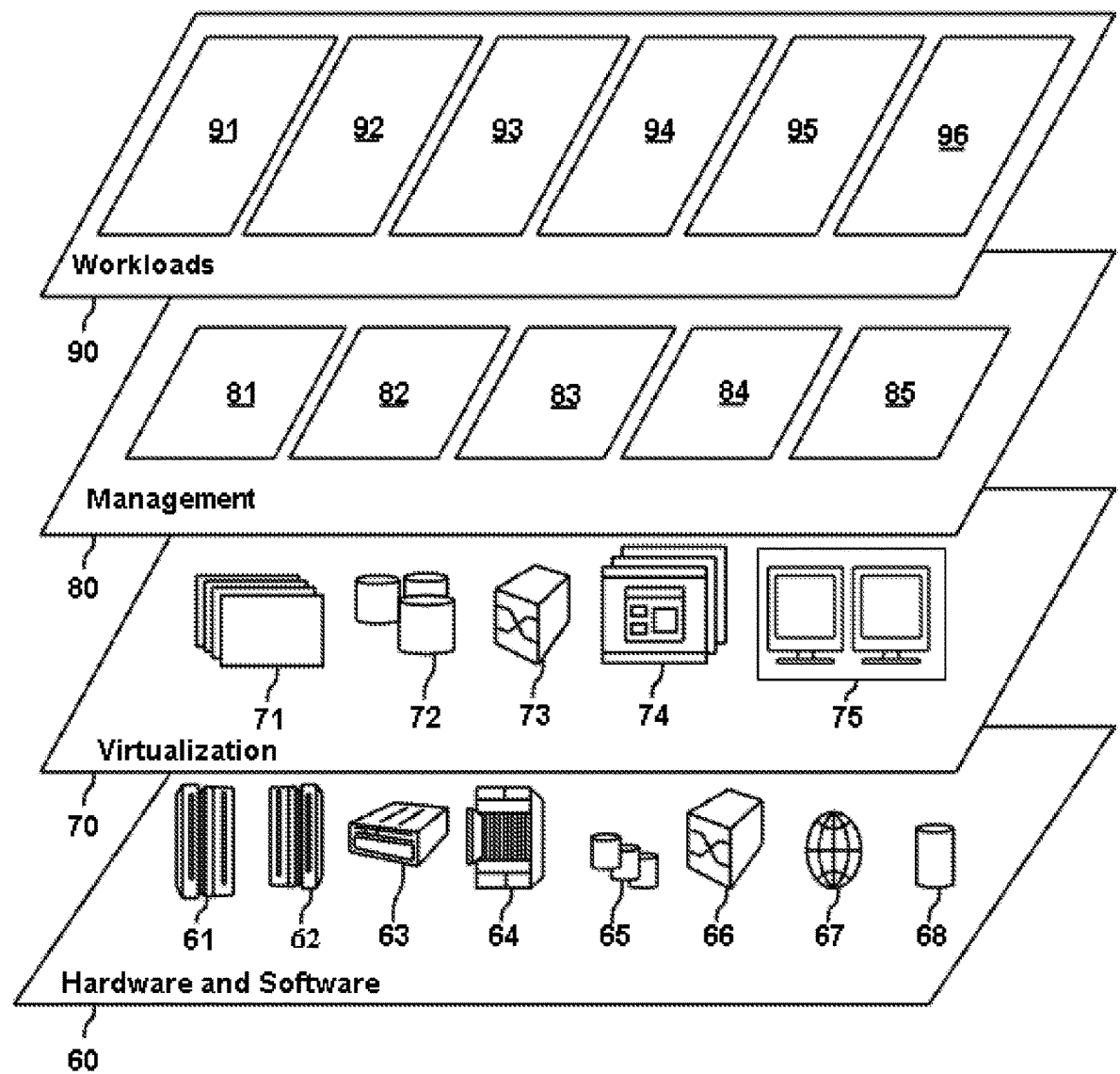
FIG. 3 depicts abstraction model layers according to some embodiments in the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and resource scheduling 96 according to embodiments of the disclosure.

Centralized resource scheduling is the most popular resource scheduling scheme adopted by mainstream platforms, e.g., Apache Mesos™ (Apache Mesos is a trademark of The Apache Software Foundation), Apache Hadoop® YARN (Yet Another Resource Negotiator) (Apache Hadoop is a registered trademark of The Apache Software Foundation), Kubernetes® (Kubernetes is a registered trademark of The Linux Foundation), etc., in which a centralized resource scheduler oversees the management and distribution of resources according to different workload requests and scheduling strategies. Typically, a user needs to pre-define the relationship between a certain workload and the resources (i.e., the resource definition for the workload) before submitting the workload request, and then notifying the resource scheduler on how to distribute the resources in a cluster, and how much resources the workload will cost. A workload, in cloud computing, is a specific application, service, capability or a specific amount of work that can be run on a cloud resource. Virtual machines, databases, containers, Hadoop nodes and applications are all considered cloud workloads. However, cloud workloads are not limited to the above.

While centralized resource scheduling can oversee the management and distribution of resources according to different workload requests and scheduling strategies, the drawbacks are also significant, e.g., centralized resource scheduling often requires very a high-performance computer to accomplish the tasks on a very large scale of clusters, as well as leads to centralized data distribution. When it comes to a disaster, centralized resource scheduling tends to have a much bigger impact and a low recovery, therefore constrains cluster scalability.

Another difficulty in resource scheduling is how to optimize resource utilization in a cluster without wasting. However, with a pre-defined resource definition, centralized resource scheduling often fails to do so. Also, how to ensure a resource definition for a specific workload is available and effective on different system architectures is also a challenge.

Embodiments in the present disclosure are targeting the one or more drawbacks or challenges discussed above. The core concept in the present disclosure is to de-centralize the resource scheduling in a cluster such that computer hosts in the cluster may achieve self-management of resources, i.e., resource scheduling may be performed by each of the computer hosts in the cluster rather than by centralized resource scheduling. In order to achieve such self-management, a model called an inquiry-handshake, according to some embodiments in the present disclosure, may be adopted. In such model, each computer host in the cluster may be associated with a corresponding proxy that oversees resource scheduling for a computer host. Each proxy associated with each computer host functions similar to a centralized resource scheduler in centralized scheduling, but merely serves the corresponding computer host itself. The proxy may regularly collect resource usage information for workloads executing on its computer host. A workload billboard, maintained by the cluster in a shared directory accessible to each of the computer hosts in the cluster, may store workload information from workload scheduler(s) in the cluster. When a workload request is received from a client, the workload scheduler receiving the workload request may register the workload request with the workload billboard. The workload scheduler may register the workload request by publishing the information of the workload to the workload billboard.

When there are free resources available on a computer host, its proxy may inquire the workload billboard, determining whether the computer host may be able to provide resources to execute at least a portion of the workload based on the available free resources and reports to the workload scheduler. If it is determined that the computer host can provide resources to execute at least a portion of the workload, the workload scheduler may send a handshake request to the computer host, indicating that the workload scheduler may send the portion of the workload to the computer host. The handshake request may be a request to initiate a communication with the computer host and may be in any formats. Responsive to receiving a confirmation from the computer host, the workload scheduler may send the portion of the workload to the computer host for execution. The workload scheduler may then update the execution status of the portion of the workload in the workload billboard, indicating that the portion of the workload has been scheduled to the computer host for execution.

The inquiry-handshake model described above distributes (de-centralizes) the resource scheduling of the cluster to each of the computer hosts, as there is no centralized resource scheduling, the drawbacks stated out in the above may be overcome. Also, as each computer host oversees its own resource management, the scalability of the cluster is no longer constrained.

Figure 4:
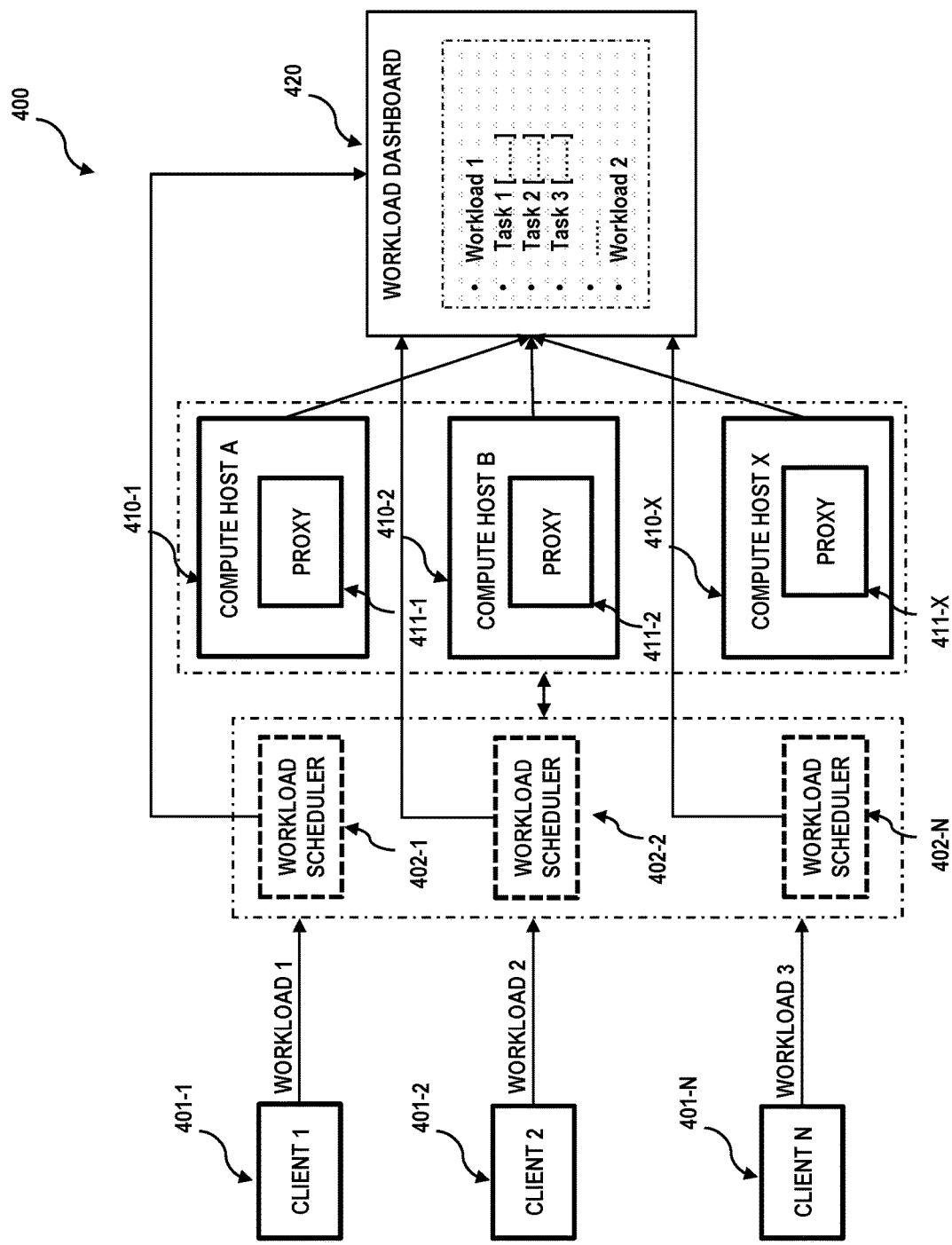
FIG. 4 depicts the diagram of an exemplary system 400 according to some embodiments in the present disclosure.

Now referring to FIG. 4, which depicts the diagram of an exemplary system 400 according to some embodiments in the present disclosure. In the exemplary system 400, a plurality of computer hosts (computer host A 410-1, computer host B 410-2, . . . , computer host X 410-X) that belongs to a cluster is shown. The dashed line surrounding the plurality of computer hosts indicates that they belong to the cluster.

According to some embodiments in the present disclosure, each of the plurality of computer hosts may be associated with a proxy 411-1, 411-2, . . . , or 411-X that may be configured to oversee the resource scheduling of corresponding computer host. The proxy 411-1, 411-2, . . . , or 411-X may be deployed locally to or be coupled to the computer host 410-1, 410-2, . . . , or 410-X). According to some embodiments in the present disclosure, each of the proxies 411-1, 411-2, . . . , 411-X may also collect, for each task of a workload, corresponding resource usage information on a regular basis. Such resource usage information may comprise for example, corresponding resource consumption of each task of the workload running on the computer host, the remaining resources on the computer host, and the reserved resources on the computer host, etc. However, resource usage information is not limited to the above and may comprise fewer or more types of information, and. According to some embodiments in the present disclosure, for each task of the workload, corresponding resource consumption information may be kept as a resource consumption record for the task, for example, by respective proxies. A resource consumption record for a task on a computer host may function as the resource definition for the task on the computer host to indicate the relationship between the task and the resources on the computer host. Unlike pre-defined resource definition in current approaches, the resource definition for the workload (i.e., the resource consumption records for the tasks of a workload, maintained by respective proxies) is dynamically created, which may better serve the purpose of resource scheduling compared with a pre-defined fixed resource definition. According to some embodiments in the present disclosure, the resource consumption records for the tasks of a workload may be updated periodically. The proxies 411-1, 411-2, . . . , 411-X together serve the de-centralized resource scheduling of the cluster.

According to some embodiments in the present disclosure, a plurality of workload schedulers 402-1, 402-2, . . . , 402-N may be coupled to the cluster. The plurality of workload schedulers may be configured to receive workload requests from a plurality of clients 401-1, 401-2, . . . , 401-N and distribute them to the plurality of computer hosts for execution with the help of respective proxies and a workload billboard 420. When a workload request is received from a client, the workload scheduler receiving the workload request may register the workload request with the billboard 420. According to some embodiments in the present disclosure, the workload scheduler may register the workload request by publishing the information of the workload to the workload billboard 420. According to some embodiments in the present disclosure, the information of the workload may comprise for example, the identifier of the workload scheduler receiving the workload request, the priority of the workload, the tasks comprised in the workload, the required resources of each task comprised in the workload, corresponding status of each task comprised in the workload, and etc. However, the information of the workload is not limited to the above and may comprise fewer or more types of information. According to some embodiments in the present disclosure, the required resources of each task comprised in the workload may be based on the resource usage information collected by the proxies discussed in the above.

It should be noted that although it is shown in FIG. 4 that there are corresponding N workload schedulers to the N clients, there might be fewer or more workload schedulers. The workload billboard 420, according to some embodiments in the present disclosure, may store the information of workloads published by corresponding workload schedulers. The workload billboard 420 may maintained by the cluster in a shared directory accessible to each of the computer hosts in the cluster. The workload billboard 420, according to some embodiments in the present disclosure, may function as a workload bulletin board to which the respective workload schedulers 402-1, 402-2, . . . , 402-N may publish information of workloads received from client 401-1, 401-2, . . . , 401-N. The workload billboard 420 may also function as a workload status tracking board to which the respective workload schedulers 402-1, 402-2, . . . , 402-N may update the statuses of workloads. The workload billboard 420 may be any appropriate data structure.

According to some embodiments in the present disclosure, an entry stored in the workload billboard 420 (i.e., information of workloads published by workload schedulers) may comprise the information in the following example format:
Workload 1 [submitted by: Workload Scheduler 1]
Task 1 [resources: 1v1, priority: 1, status: scheduled]
Task 2 [resources: 1v2, priority: 1, status: scheduled]
Task 3 [resources: 1v1, priority: 1, status: pending]

In the above example format, the entry Workload 1 corresponds to a workload submitted by Workload Scheduler 1 and comprises a plurality of tasks [Task 1, Task 2, Task 3, . . . ]. Each task of Workload 1 is also tagged with corresponding required resources information, priority information and status information. The required resources information may be in the format of resource requirement level information (1v1, 1v2, . . . ) that are known to each of the computer host, or in any appropriate formats. The priority information may be inherited from the priority of a workload (Workload 1), and the status information may be updated by the workload scheduler publishing the information (Workload Scheduler 1). For example, the status of Task 1 has been scheduled thus its status is scheduled. It should be noted that the above example format is merely an illustration, any other appropriate format may be adopted. It also should be noted entries stored in workload billboard 420 are shown in FIG. 4 in very simplified form as due to the size constrains of the figures, it should not be interpreted as inconsistency.

According to some embodiments in the present disclosure, the plurality of workload schedulers 402-1, 402-2, . . . , 402-N and the workload billboard 420 together function as the workload scheduler for the cluster. The dashed line surrounding the plurality of workload schedulers indicates that all the workload schedulers together serve the distributed workload scheduling of the cluster with the help of the workload billboard. The plurality of workload schedulers 402-1, 402-2, . . . , 402-N, the workload billboard 420, and the plurality of proxies 411-1, 411-2, . . . , 411-X together serve the de-centralized workload scheduling and resource scheduling of the cluster.

A plurality of clients 401-1, 401-2, . . . , 401-N may submit workload requests without any knowledge of the de-centralized workload scheduling and resource scheduling of the cluster, i.e., the de-centralized resource scheduling may be transparent to the clients. According to some embodiments in the present disclosure, with the help of the plurality of proxies 411-1, 411-2, . . . , 411-X and the workload billboard 420, the plurality of workload schedulers 402-1, 402-2, . . . , 402-N may to schedule workloads submitted by the plurality of clients 401-1, 401-2, . . . , 401-N to the cluster.

The detailed process of the workload scheduling and resource scheduling will be discussed in detail in the following with reference to FIG. 5 in which the flow diagram of an exemplary method 500 according to some embodiments in the present disclosure is depicted.

Figure 5:
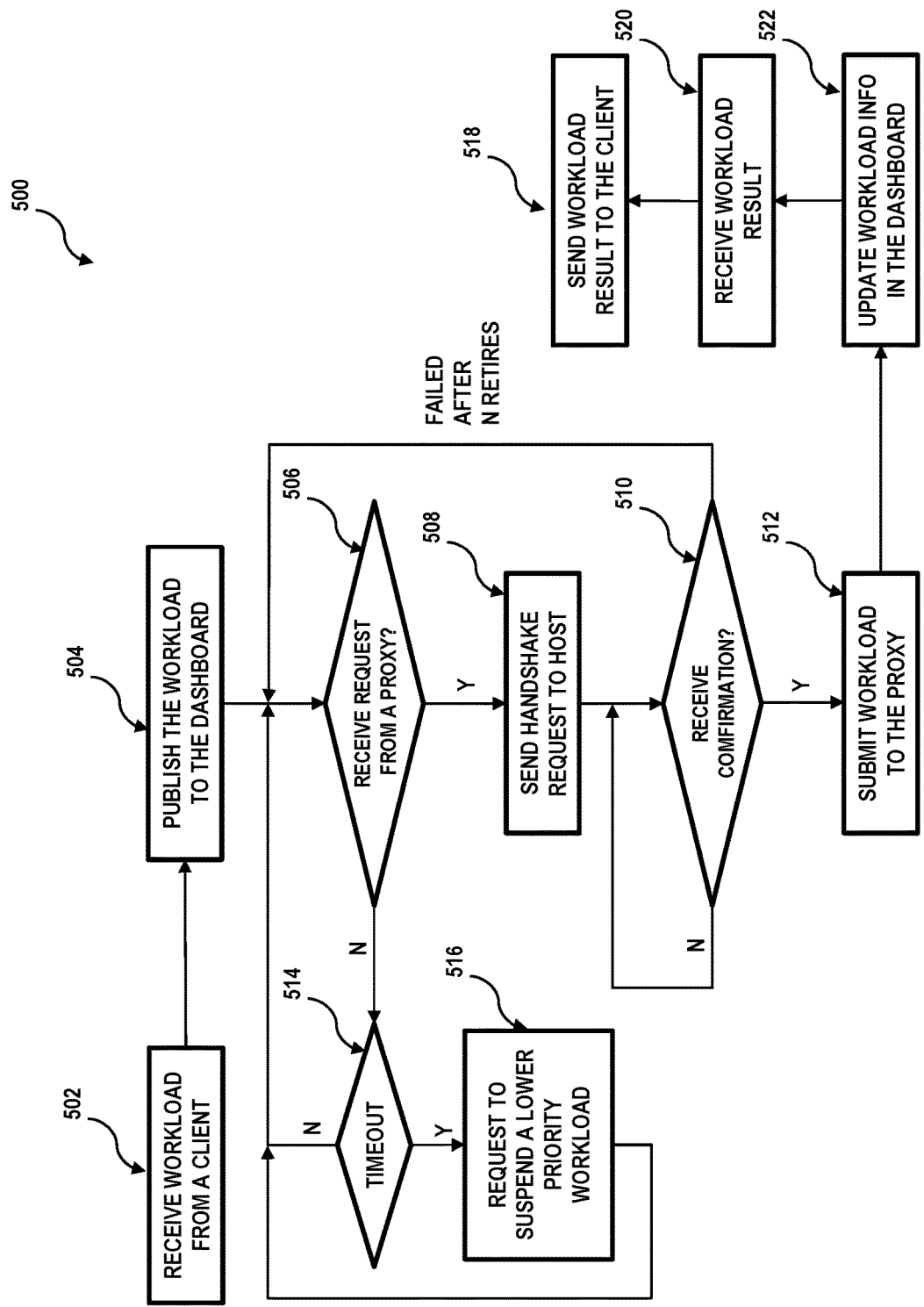
FIG. 5 depicts the flow diagram of an exemplary method 500 according to some embodiments in the present disclosure.

Now referring to FIG. 5, the exemplary method 500 according to some embodiments in the present disclosure starts at step 502, in which a workload request may be received, e.g., by the cluster in FIG. 4 that comprises a plurality of computer hosts 410-1, 410-2, . . . , 410-X from one of the plurality of clients 401-1, 401-2, . . . , 401-N.

Then at step 504, the workload scheduler receiving the workload request may register the received workload request by publishing the information of the workload to a workload billboard, e.g., the workload billboard 420 in FIG. 4. As discussed in the above, the information of the workload may comprise for example, the identifier of the workload scheduler receiving the workload request, the priority of the workload, the tasks comprised in the workload, corresponding status of each task comprised in the workload, and etc.

The method 500 may then flow to step 506, in which it is determined whether any request to schedule the workload is received from any proxy. According to some embodiments in the present disclosure, each of the proxies in corresponding computer host may inquire, on a regular basis, the workload billboard 420 to determine whether its computer host may be able to provide available free resources to execute at least a portion of a workload. If a proxy determines that its computer host may provide (the YES branch at step 506) available free resources to execute at least a portion of a workload (e.g., Task 1 and Task 2 of Workload 1), the proxy may send a request to the workload scheduler publishing the information of the workload (Workload Scheduler 1), indicating that the computer host of the proxy may be able to provide available free resources to execute the portion of a workload (e.g., Task 1 and Task 2 of Workload 1). According to some embodiments in the present disclosure, the proxy may make such determination based on the published information of the workload and the free resources available on its computer host. For example, as aforementioned, the information of the workload may comprise required resources of each task comprised in the workload, the proxy may determine that the free resources available on its computer host may be able to execute the Task 1 and Task 2 of Workload 1 based on the required resources of Task 1 and Task 2 of Workload 1.

Responsive to receiving a request (which indicates that the computer host of the proxy may be able to provide available free resources to execute the portion of a workload (e.g., Task 1 and Task 2 of Workload 1) from a proxy, the method 500 may flow to step 508 in which a handshake request may be sent by the workload scheduler (Workload Scheduler 1) to the computer host of the proxy. Then at step 510, it is determined whether a confirmation is received from the computer host, and if yes, the workload scheduler (Workload Scheduler 1) may submit the portion of the workload (e.g., Task 1 and Task 2 of Workload 1) to the computer host at step 512 and then the corresponding status of the portion of the workload in the workload billboard 420 may be updated by the workload scheduler (Workload Scheduler 1) at step 522. For example, the corresponding statuses of Task 1 and Task 2 of Workload 1 may be updated from pending to scheduled. According to some embodiments in the present disclosure, the status of a task may also be updated to reflect to which computer host to which the task has been scheduled.

Then at step 520, the results of the portion of the workload (e.g., Task 1 and Task 2 of Workload 1) may be received by the workload scheduler (Workload Scheduler 1). And then at step 518, the results of the workload may be sent to the client submitting the workload after the results of all portions of the workload have been received. The workload scheduler (Workload Scheduler 1) may summarize the results of all portions of the workload before sending them to the client.

If, however, no confirmation has been received from the computer host (the NO branch of step 508), the work scheduler (Workload Scheduler 1) may re-send the handshake request until fails after a pre-determined number of tries. The method may then return to step 506.

If, at step 506, no response is received from any proxies (the NO branch of step 506), it is determined whether a timeout event is detected. If NO, the method may flow back to step 506 and if YES, a request to suspend a lower priority workload may be initiated by the workload scheduler (Workload Scheduler 1) at step 516. The method may then flow back to step 506 after the request to suspend a lower priority workload has been successfully executed (the handling of the request to suspend a lower priority workload will be discussed with reference to FIG. 6 in the following).

Figure 6:
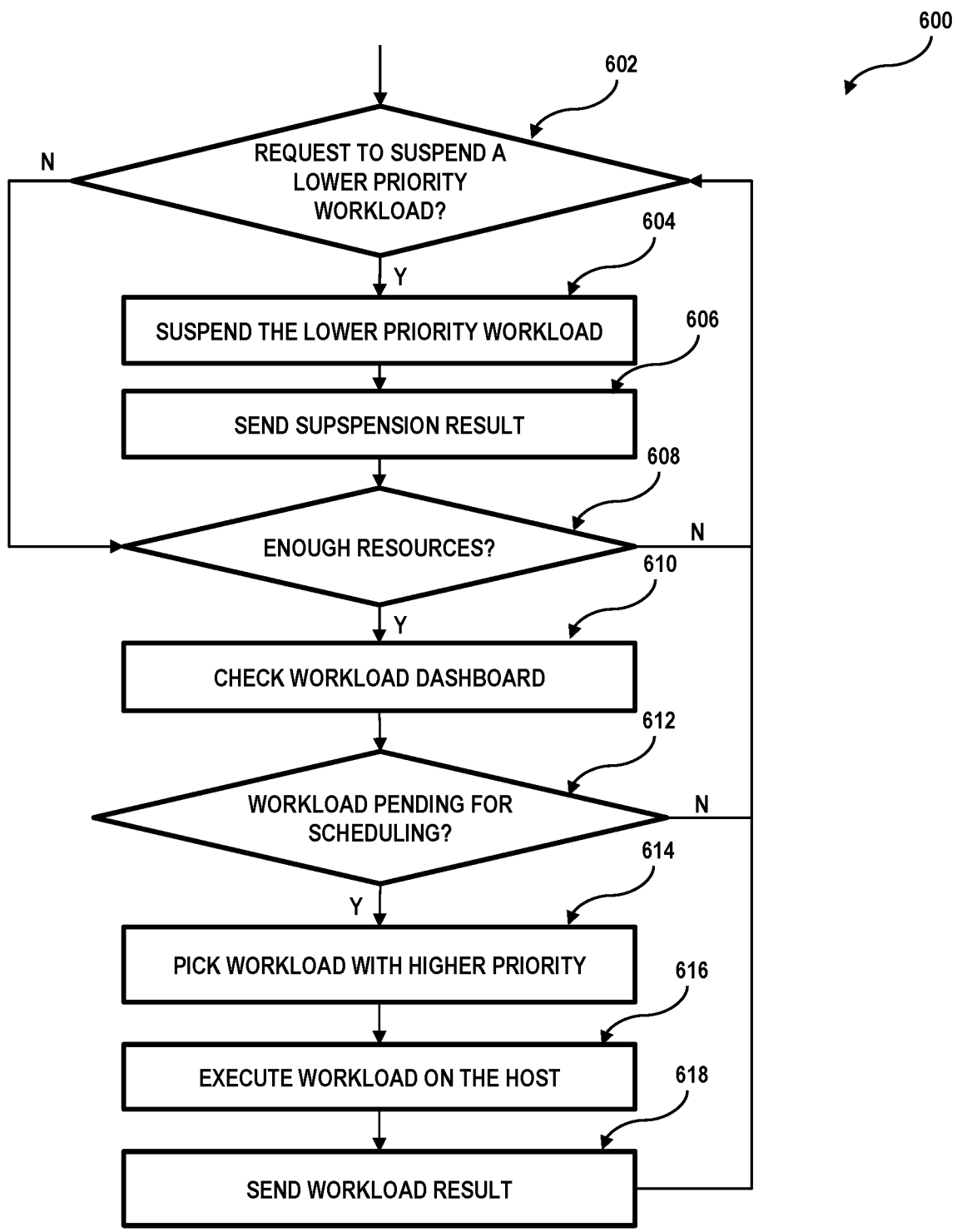
FIG. 6 depicts the flow diagram of an exemplary method 600 according to some embodiments in the present disclosure.

Now referring to FIG. 6, which depicts the flow diagram of an exemplary method 600 according to some embodiments in the present disclosure. The exemplary method 600 is the handling of the request to suspend a lower priority workload mentioned in the above. Such handling may be triggered responsive to a workload request with a higher priority is received by the cluster and no computer host can provide enough available free resources, e.g., a timeout event detected at step 514 in FIG. 5. According to some embodiments in the present disclosure, the handling of the request to suspend a lower priority workload may be executed by at least one of the proxies.

At step 602, it is determined whether a request to suspend a lower priority workload is received, for example, by from the workload scheduler receiving the workload request with a higher priority. If yes, a proxy may check with the workload billboard 420 whether any portion of the lower priority workload executing on its computer host may be suspended and suspend the execution of the workload accordingly at step 604 if yes. Then the proxy may send the suspension result at step 606 to the workload scheduler, requesting the workload scheduler to update corresponding statuses of the portion of the lower priority workload in the workload billboard 420 if the suspension of the portion of the lower priority workload is successful.

Then at step 608, it is determined whether there are enough resources available to execute at least a portion of the workload with a higher priority by the proxy. If it is determined that there are enough available free resources (YES branch of step 608), the proxy may inquire (check) the workload billboard 420 at step 610 to determine whether any workload is pending for scheduling at step 612, and if yes, the proxy may pick at least a portion of a workload with a higher priority at step 614 and execute the portion on its computer host at step 616. Then the proxy may send the result of the portion of the workload with the higher priority at step 618. The processing from step 614 to step 616 corresponding to the proxy side processing of step 508 and step 510 in FIG. 5 are not shown for the purpose of brevity.

If, however, it is determined that no request is received to suspend a lower priority workload (the NO branch of step 602), the method 600 flows to step 608. If, at step 608 it is determined that the computer host does not have enough free resources available, the method 600 flows back to step 602. Similarly, if, at step 612, it is determined that there is no workload pending for scheduling, the method 600 flows back to step 602.

Figure 7:
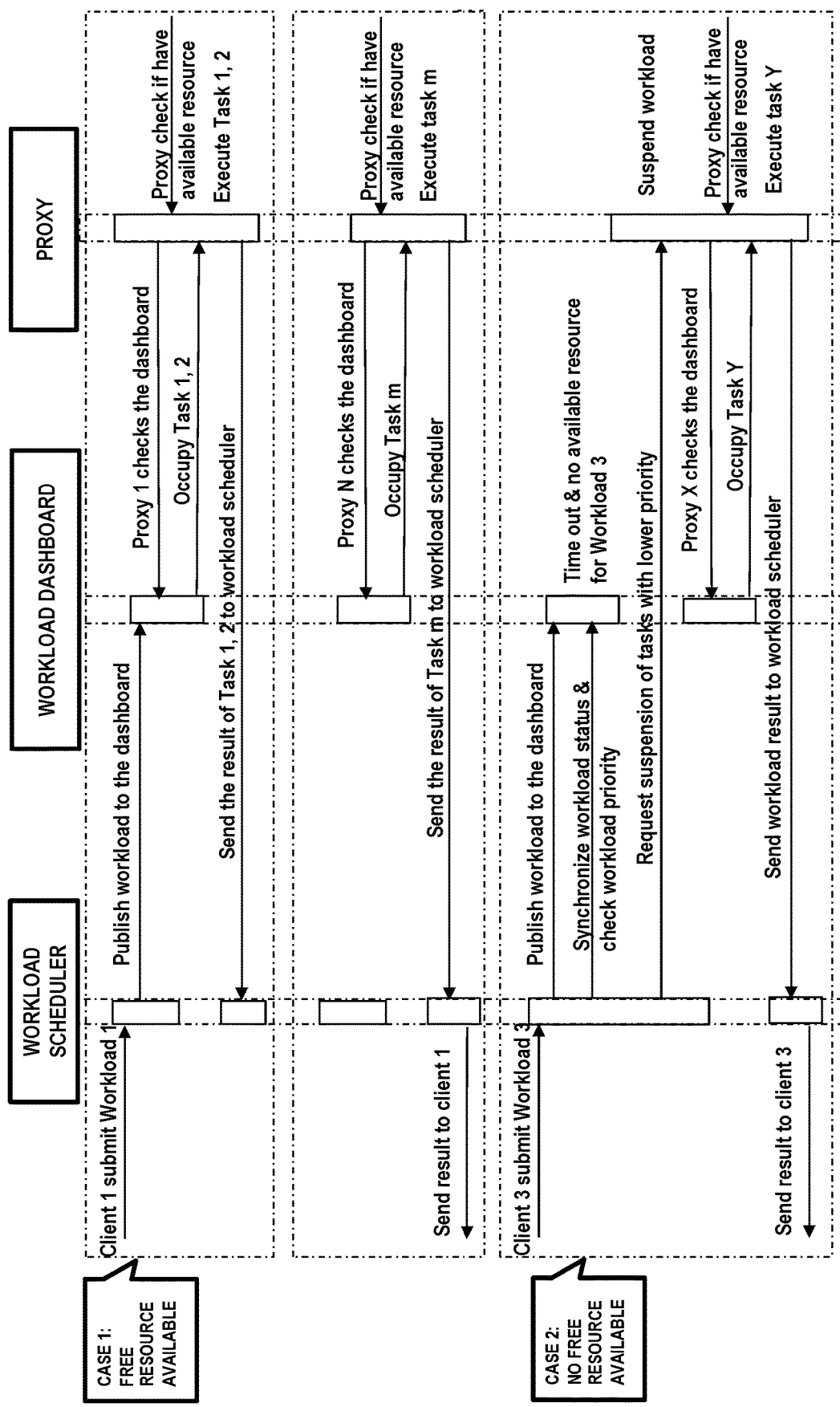
FIG. 7 depicts a flow diagram in another form according to some embodiments in the present disclosure.

Now referring to FIG. 7, which depicts a flow diagram in another form according to some embodiments in the present disclosure. It should be noted that the workload scheduler and the proxy refer to one or more of the respective workload schedulers 402-1, 402-2, . . . , 402-N and one or more of the respective proxies 411-1, 411-2, . . . , 411-X, although only one workload scheduler and one proxy are shown.

In the case 1 scenario, client 1 may submit a workload request (Workload 1), the workload scheduler receiving the workload request may publish the information of workload 1 to the workload billboard. Then each of the proxies in corresponding computer host may check the billboard and determine whether its computer host may provide free resources available to execute at least a portion of workload 1, for example, proxy 1 of computer host 1 checks the billboard, and determines that computer host 1 may provide free resources available to execute Task 1 and Task 2 of Workload 1. The computer host of proxy 1 may then 'occupy' Task 1 and Task 2 of Workload 1, i.e., execute Task 1 and Task 2 of Workload 1 and send the result of Task 1 and Task 2 to the workload scheduler. Another proxy, proxy N of computer host N checks the billboard, and determines that computer host N may provide free resources available to execute Task m of Workload 1, where task m is the last task of Workload 1. The computer host of proxy N may then 'occupy' Task m of Workload 1, i.e., execute Task m of Workload 1 and send the result of Task m to the workload scheduler. After receiving the results of all portions of Workload 1, the workload scheduler may summarize the results of all portions of the workload and send it the client 1.

In the case 2 scenario, client 3 may submit a workload request with a higher priority (Workload 3) and find out that there is no available free resources for it. The workload scheduler receiving Workload 3 may request a suspension of tasks with lower priorities (please refer to FIG. 6 for details of the handling of the request). After the suspension of workloads with lower priorities, the proxies may check the billboard to determine whether their computer hosts may provide available free resources to execute portions of Workload 3, for example, proxy X of computer host X determines that computer host X may execute Task Y of Workload 3. Computer host X may occupy Task Y of Workload 3, i.e., execute it and send the result to the workload scheduler. After receiving the results of all portions of Workload 3, the workload scheduler may summarize the results of all portions of the workload and send it the client 3.

According to some embodiments in the present disclosure, a computer-implemented method performed by one or more processing units for resource scheduling comprises receiving a workload request; publishing the information of the workload to a workload billboard accessible to a plurality of computer hosts, each of the plurality of computer hosts being associated with a corresponding proxy configured to manage the resource scheduling of the computer host; receiving a request to schedule at least a portion of the workload from a proxy; and sending the portion of the workload to the computer host associated with the proxy.

According to some embodiments in the present disclosure, a computer-implemented method performed by one or more processing units for resource scheduling further comprises responsive to receiving the request to schedule at least a portion of the workload from the proxy sending a handshake request to the computer host associated with the proxy; and responsive to receiving a confirmation from the computer host, sending the portion of the workload to the computer host.

According to some embodiments in the present disclosure, a computer-implemented method performed by one or more processing units for resource scheduling further comprises updating the information of the portion of the workload in the workload billboard. According to some embodiments in the present disclosure, a computer-implemented method performed by one or more processing units for resource scheduling further comprises receiving a result of the portion of the workload from the computer host.

According to some embodiments in the present disclosure, a computer-implemented method performed by one or more processing units for resource scheduling further comprises responsive to no request to schedule at least a portion of the workload is received and detecting a timeout event, sending a request to suspend a lower priority workload.

According to some embodiments in the present disclosure, a computer-implemented method performed by one or more processing units for resource scheduling further comprises responsive to a successful suspension of the lower priority workload, updating the information of the lower priority workload in the billboard.

According to some embodiments in the present disclosure, a computer-implemented method performed by one or more processing units for resource scheduling further comprises determining whether a request to schedule at least a portion of the workload from a proxy is received; and responsive to the request to schedule the portion of the workload being received from a proxy, sending the portion of the workload to the computer host associated with the proxy.

According to some embodiments in the present disclosure, the information of the workload comprises at least one type of information selected from the group consisted of: i) an identifier of the workload scheduler receiving the workload request, ii) a priority of the workload, the tasks comprised in the workload, iii) a required resources of each task comprised in the workload, and iv) corresponding status of each task comprised in the workload.

According to some embodiments in the present disclosure, the request to schedule at least a portion of the workload may be received from the proxy responsive to a determination by the proxy that the computer host of the proxy is able to provide free resources available to execute the portion of the workload.

According to some embodiments in the present disclosure, the billboard functions as a workload bulletin board for publishing information of workloads as well as a workload status tracking board to track the statuses of workloads.

It should be pointed out that embodiments discussed with references to the figures are merely for the purpose of simplified illustration, therefore they should not adversely limit the scope of the disclosure.

It should be noted that the resource scheduling according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects in the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations in the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects in the present disclosure.

Aspects in the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments in the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments in the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by one or more processing units for resource scheduling, comprising:
   receiving a workload request;
   publishing information from a workload associated with the workload request to a workload billboard accessible to a plurality of computer hosts, each of the plurality of computer hosts being associated with a corresponding proxy for managing the resource scheduling of a computer host from the plurality of computer hosts;
   receiving a request to schedule at least a portion of the workload from a proxy associated with the computer host; and
   sending the portion of the workload to the computer host associated with the proxy.

2. The computer-implemented method of claim 1, further comprising responsive to receiving the request to schedule at least the portion of the workload from the proxy:
   sending a handshake request to the computer host associated with the proxy; and
   responsive to receiving a confirmation from the computer host, sending the portion of the workload to the computer host.

3. The computer-implemented method of claim 1, further comprising:
   updating a portion of the information associated with the portion of the workload in the workload billboard.

4. The computer-implemented method of claim 1, further comprising:
   receiving a result of the portion of the workload from the computer host.

5. The computer-implemented method of claim 1, further comprising:
   responsive to not receiving the request to schedule at least the portion of the workload, detecting a timeout event and sending a request to suspend a lower priority workload.

6. The computer-implemented method of claim 5, further comprising:
   responsive to a successful suspension of the lower priority workload, updating a second portion of the information corresponding to the lower priority workload in the workload billboard.

7. The computer-implemented method of claim 6, further comprising:
   determining whether the request to schedule at least the portion of the workload from the proxy is received; and responsive to the request to schedule the portion of the workload being received from a proxy, sending the portion of the workload to the computer host associated with the proxy.

8. The computer-implemented method of claim 1, wherein the information from the workload comprises at least one type of information selected from a group comprising an identifier of the workload scheduler receiving the workload request, a priority of the workload, tasks comprised in the workload, required resources of each task comprised in the workload, and corresponding status of each task comprised in the workload.

9. The computer-implemented method of claim 1, wherein the request to schedule at least the portion of the workload may be received from the proxy responsive to a determination by the proxy that the computer host of the proxy is able to provide free resources available to execute the portion of the workload.

10. The computer-implemented method of claim 1, wherein the workload billboard functions as a workload bulletin board for publishing information of workloads as well as a workload status tracking board to track the statuses of workloads.

11. A computer program product comprising a non-transitory computer readable storage having program codes embodied therewith, the program codes comprising:
program codes to receive a workload request;
program codes to publish information from a workload associated with the workload request to a workload billboard accessible to a plurality of computer hosts, each of the plurality of computer hosts being associated with a corresponding proxy for managing the resource scheduling of a computer host from the plurality of computer hosts;
program codes to receive a request to schedule at least a portion of the workload from a proxy associated with the computer host; and
program codes to send the portion of the workload to the computer host associated with the proxy.

12. The computer program product of claim 11, the program codes comprising: responsive to receiving the request to schedule at least the portion of the workload from the proxy:
program codes to send a handshake request to the computer host associated with the proxy; and
program codes to responsive to receiving a confirmation from the computer host, send the portion of the workload to the computer host.

13. The computer program product of claim 11, the program codes comprising:
program codes to update a portion of the information associated with the portion of the workload in the workload billboard.

14. The computer program product of claim 11, the program codes comprising:
program codes to responsive to not receiving the request to schedule at least the portion of the workload, detecting a timeout event, and sending a request to suspend a lower priority workload.

15. The computer program product of claim 14, the program codes comprising:
program codes to responsive to a successful suspension of the lower priority workload, update a second portion of the information corresponding to the lower priority workload in the workload billboard.

16. A computer-implemented system, the program codes comprising:
a processor;
a memory medium, coupled to the processor and comprising program instructions, wherein the program instructions comprising:
program instructions to receive a workload request;
program instructions to publish information from the workload associated with the workload request to a workload billboard accessible to a plurality of computer hosts, each of the plurality of computer hosts being associated with a corresponding proxy for managing the resource scheduling of a computer host from the plurality of computer hosts;
program instructions to receive a request to schedule at least a portion of the workload from a proxy associated with the computer host; and
program instructions to send the portion of the workload to the computer host associated with the proxy.

17. The computer-implemented system of claim 11, the program instructions comprising: responsive to receiving the request to schedule at least the portion of the workload from the proxy:
program instructions to send a handshake request to the computer host associated with the proxy; and
program instructions to responsive to receiving a confirmation from the computer host, send the portion of the workload to the computer host.

18. The computer-implemented system of claim 11, the program instructions comprising:
program instructions to update the information of the portion of the workload in the workload billboard.

19. The computer-implemented system of claim 11, the program instructions comprising:
program instructions to responsive to not receiving the request to schedule at least the portion of the workload, detecting a timeout event, and sending a request to suspend a lower priority workload.

20. The computer-implemented system of claim 14, the program instructions comprising:
program instructions to responsive to a successful suspension of the lower priority workload, update a second portion of the information corresponding to the lower priority workload in the workload billboard.

* * * * *